US008631313B2

(12) United States Patent
Cheng

(10) Patent No.: US 8,631,313 B2
(45) Date of Patent: Jan. 14, 2014

(54) METHOD OF ERROR DETECTION FOR WIRELESS TRANSMISSION

(75) Inventor: Tsung-Yo Cheng, New Taipei (TW)

(73) Assignee: Acer Incorporated, New Taipei (TW)

( * ) Notice: Subject to any disclaimer, the term of this patent is extended or adjusted under 35 U.S.C. 154(b) by 184 days.

(21) Appl. No.: 13/225,575

(22) Filed: Sep. 6, 2011

(65) Prior Publication Data

US 2013/0031448 A1    Jan. 31, 2013

(30) Foreign Application Priority Data

Jul. 25, 2011   (TW) .............................. 100126197 A

(51) Int. Cl.
*H03M 13/00*   (2006.01)

(52) U.S. Cl.
USPC ............................ 714/807; 714/776; 714/758

(58) Field of Classification Search
USPC ......... 714/807, 776, 746, 754, 755, 752, 753, 714/758, 757
See application file for complete search history.

(56) References Cited

U.S. PATENT DOCUMENTS

| | | | |
|---|---|---|---|
| 6,832,314 B1 | 12/2004 | Irvin | |
| 7,088,398 B1 * | 8/2006 | Wolf et al. | 348/423.1 |
| 7,295,578 B1 * | 11/2007 | Lyle et al. | 370/503 |
| 7,558,326 B1 * | 7/2009 | Lyle et al. | 375/244 |
| 7,716,662 B2 * | 5/2010 | Seiden | 717/173 |
| 2004/0131186 A1 * | 7/2004 | Kasuya et al. | 380/255 |
| 2007/0242703 A1 | 10/2007 | Pelletier | |
| 2010/0150045 A1 * | 6/2010 | Hundal et al. | 370/311 |
| 2010/0332933 A1 | 12/2010 | Kubota | |

OTHER PUBLICATIONS

Ericsson: "Ciphering Models", 3GPP TSG SA WG3 (Security) 3GPP S3-99061, Mar. 23-26, 1999, Stockholm, TSG-RAN Working Group 2 (Radio layer 2 and Radio layer 3) TSGR2#2(99)146, Mar. 8-11, 1999, Stockholm, XP050435538 (including VODAFONE: "Proposal for radio interface ciphering architecture" TSG SA WG3 Security, TSGS3#3(99)101, Meeting#3, May 11-12, 1999, Bonn, XP050435548).

* cited by examiner

*Primary Examiner* — Fritz Alphonse
(74) *Attorney, Agent, or Firm* — Winston Hsu; Scott Margo

(57) ABSTRACT

A transmitter generates an encrypted data by processing a specific data according to a specific transmission mode, generates a verification code according to the specific transmission mode, and provides a protocol data unit according to the encrypted data and the verification code. After transmission, a receiver decodes the protocol data unit and determines whether the decrypted data of the protocol data unit matches the verification code, thereby providing error detection for wireless transmission.

8 Claims, 3 Drawing Sheets

METHOD OF ERROR DETECTION FOR WIRELESS TRANSMISSION

CROSS REFERENCE TO RELATED APPLICATION

This application claims priority to Taiwan Patent Application No. 100126197 filed Jul. 25, 2011, and included herein by reference in its entirety for all intents and purposes.

BACKGROUND OF THE INVENTION

1. Field of the Invention

The present invention is related to a method of error detection for wireless transmission, and more particularly, to a method of error detection using CRC for wireless transmission.

2. Description of the Prior Art

Third generation mobile communication system utilizes a radio receiving method of wideband code division multiple access (WCDMA) and is capable of providing better performance in frequency efficiency, radio coverage, communication quality and transmission speed for multi-media applications. Also, third generation mobile communication system can satisfy different quality of service (QoS) requirements to provide a flexible bi-directional transmission service with better communication quality and low call drop rate.

Since the $3^{rd}$ generation partnership project (3GPP) has thorough definitions in related specifications, the operations of the broadcast mode and multicast mode are described only briefly hereinafter. The detailed operation of 3G system $3^{rd}$ Generation Partnership Project (3GPP) has. For universal mobile telecommunications system (UMTS), a third generation mobile communication system includes a user equipment (UE), a UMTS terrestrial radio access network (UTRAN), and a core network (CN). In WCDMA systems, the protocol for radio interface includes physical layer L1, data link layer L2, and network layer L3. Communication protocols for data link layer L2 include access stratum (AS) and non-access stratum (NAS). AS includes multiple sub-layers with various functions, such as radio resource control (RRC), radio link control (RLC), media access control (MAC), packet data convergence protocol (PDCP), broadcast/multicast control (BMC). Data is processed in each sub-layer correspondingly. A service data unit (SDU) is the data received by a sub-layer. A protocol data unit (PDU) is the data transmitted from a sub-layer after processing a received SDU. The receiver and transmitter are configured to process data in opposite directions. Since they are well-known to those skilled in the art, the detailed operations of each sub-layer are described only briefly herein.

The main function of the RLC communication protocol is to perform segmentation, transmission, retransmission and reassembly according to the transmission quality requirement of third generation mobile communication system. In third generation mobile communication system, the transmission quality is graded into four different grades such as conversational, streaming, interactive and background. The RLC operates in three modes to satisfy different transmission quality requirements. The three modes are listed in the following:

1. Transparent mode (TM): The packet data may be directly segmented according to its length without other processing. TM is suitable for real time transmission services, such as voice calls.
2. Unacknowledged mode (UM): In UM, a header is attached to the packet data so that the receiver may check the sequence number of the packet data and to discard erroneous packet data. UM is suitable for services which require both real-time and sequential transmissions, such as voice over Internet protocol (VoIP) or videophone.
3. Acknowledged mode (AM): In addition to segmenting data and attaching header, the receiver is configured to perform sequence check, repetitive check and data retransmission so as to ensure data accuracy. AM is suitable for a high-accuracy data service such as web browsing, electronic mail, or file transfer.

Data accuracy and security for both user data and commands need to be guaranteed during radio transmission. The conventional third generation mobile communication system performs encryption on transmitted data using a ciphering method. FIG. 1 is a diagram illustrating encryption and decryption in a conventional third generation mobile communication system. On the left of the dotted line is the transmitter which is configured to generate a plurality of keystream blocks KEYSTREAM by performing F8 algorithm on multiple parameters, such as a ciphering key CK, a count COUNT-C, a bearer identifier BEARER, a direction identifier DIRECTION and a length indicator LENGTH. The transmitter may then generate a ciphered text block CIPHER-TEXT by performing an exclude-OR operation on KEYSTREAM and a plain text PLAIN-TEXT. On the right of the dotted line is the receiver which is configured to perform decryption by performing an exclude-OR operation on KEYSTREAM and the ciphered text block CIPHER-TEXT, thereby recovering the original plain text PLAIN-TEXT.

A wireless communication device is configured to operate in TM during voice communication. The PDU generated after data encryption only include audio data, but no other attached data for verification at the receiver. If there is interference or the transmitter and the receiver are not synchronized, noise may be present during the entire communication process.

SUMMARY OF THE INVENTION

The present invention provides a method of error detection for wireless transmission. The method includes generating an encrypted data by processing a specific data in a specific transmission mode; generating a verification code according to the specific transmission mode; providing a protocol data unit according to the encrypted data and the verification code; and after transmitting the PDU, decoding the PDU and determining whether a decrypted data of the PDU matches the verification code.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
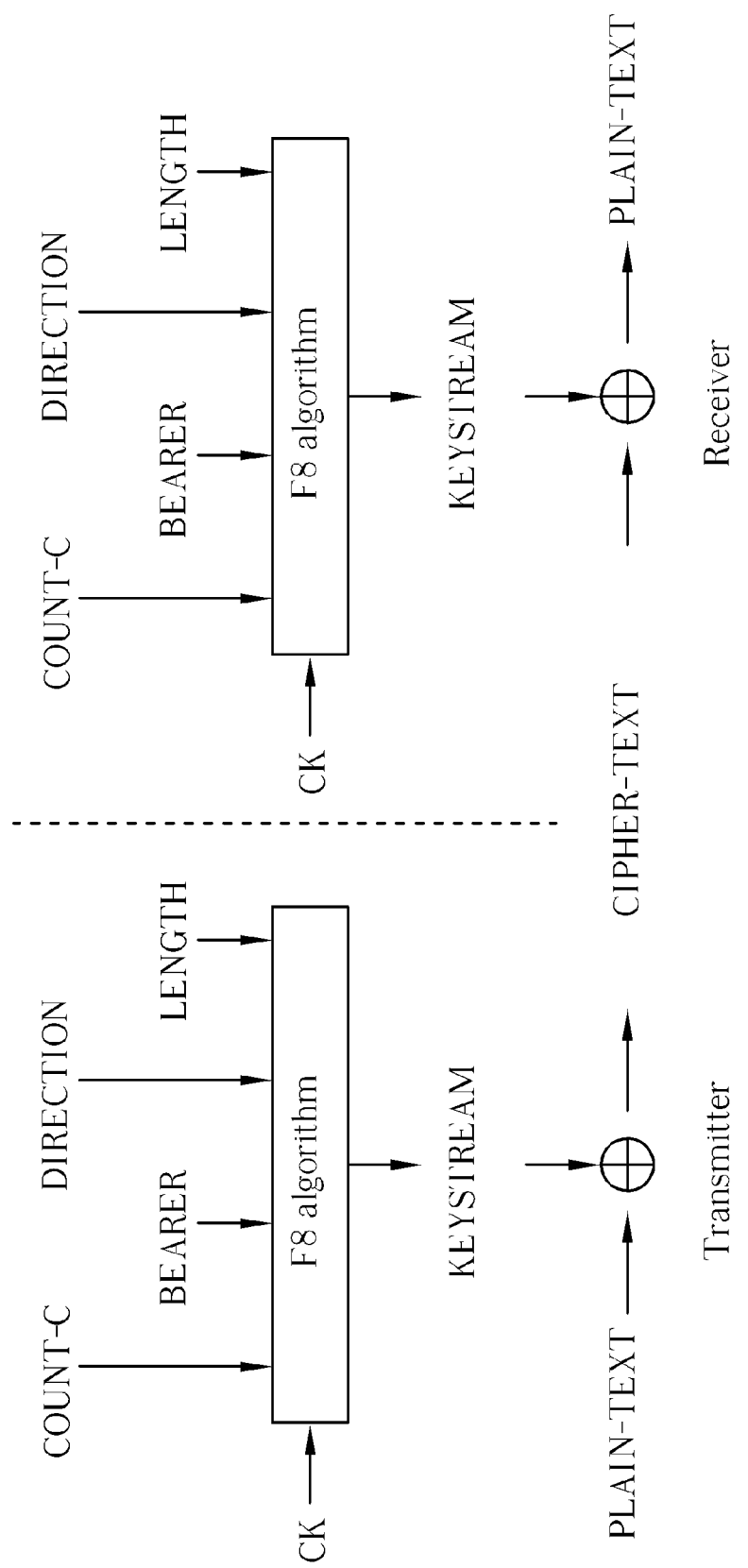
FIG. 1 is a diagram illustrating encryption and decryption in a conventional third generation mobile communication system.
Figure 2:
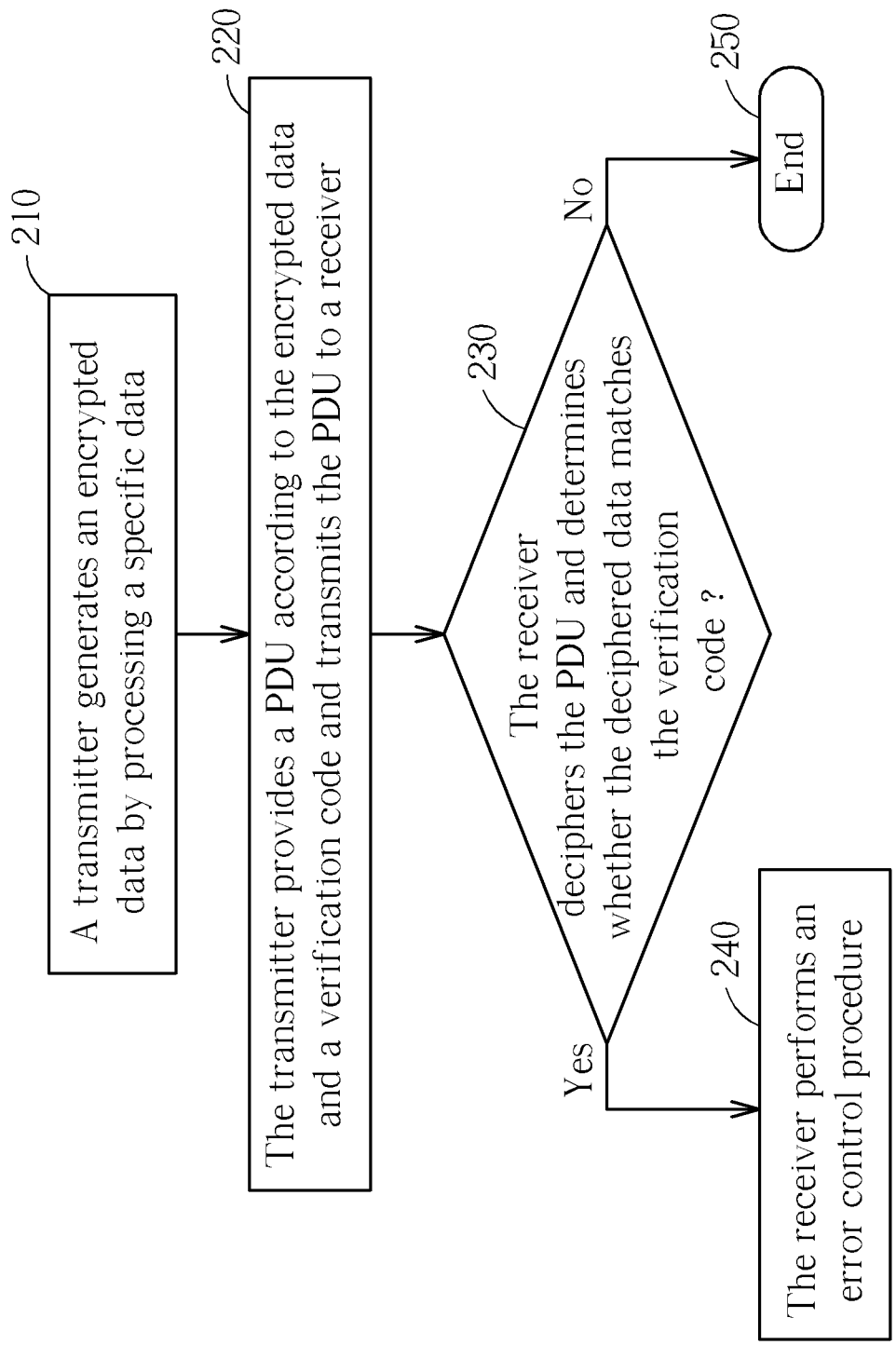
FIG. 2 is a flowchart illustrating a method of error detection for wireless transmission according to the present invention.

FIG. 2 is a flowchart illustrating a method of error detection for wireless transmission according to the present invention. The flowchart in FIG. 2 includes the following steps:

Step 210: a transmitter generates an encrypted data by processing a specific data.

Step 220: the transmitter provides a PDU according to the encrypted data and a verification code and transmits the PDU to a receiver.

Step 230: the receiver deciphers the PDU and determines whether the deciphered data matches the verification code; if yes, execute step 240; if no, execute step 250.

Step 240: the receiver performs an error control procedure.

Step 250: end.

In the present invention, the transmitter and the receiver may be a user equipment or a network device. In other words, the present invention may perform error detection for wireless transmission between two user equipments, between two network devices, or between a user equipment and a network device.

In step 210, the transmitter is configured to generate the encrypted data by processing the specific data according to its operational mode. In TM, the transmitter may generate the encrypted data by segmenting a received SDU. In UM, the transmitter may generate the encrypted data by segmenting a received SDU, as well as additional information such as sequence number, length indicator, or PAD. In AM, the transmitter may generate the encrypted data by segmenting a received SDU, as well as additional information such as sequence number, length indicator, PAD or status PDU.

In step 220, the transmitter provides the PDU according to the encrypted data and the verification code. In an embodiment of the present invention, a frame check sequence (FCS) may be generated as the verification code using cyclic redundancy check (CRC). FCS may include encrypted data content, a length indicator, or a PAD which indicates how data is encrypted in different modes. FCS may be a multi-bit CRC code, based on which the data or header of the PDU may be verified. The detailed operation of CRC is well-known to those skilled in the art, and is not explained further in the present application.

Figure 3A:
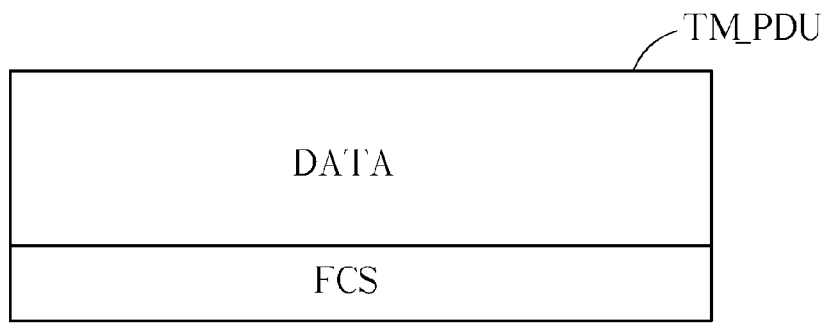
FIGS. 3A-3C are diagrams illustrating the operation of the RLC layer according to the present invention.
Figure 3B:
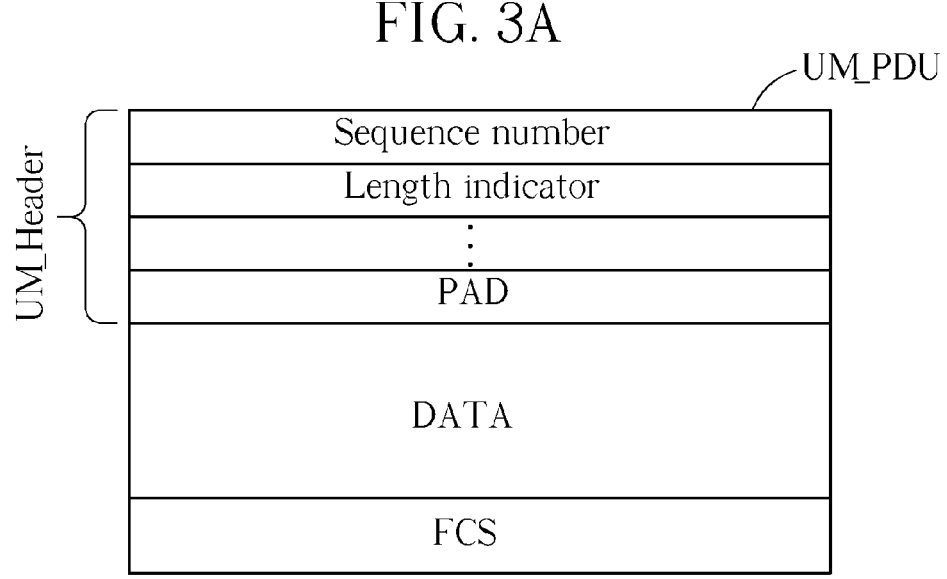
Figure 3C:
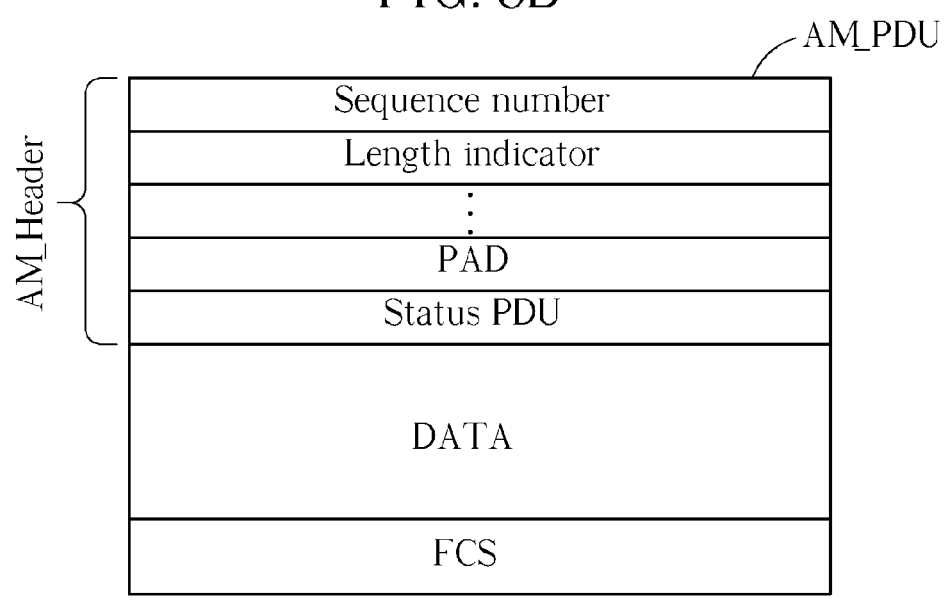

According to 3GPP specifications, a transparent mode protocol data unit includes a data field, while an unacknowledged/acknowledged mode protocol data unit includes a data field and a header field. FIGS. 3A~3C are diagrams illustrating the operation of the RLC layer according to the present invention. FIG. 3A illustrates a transparent mode protocol data unit TM_PDU. FIG. 3B illustrates an unacknowledged mode protocol data unit UM_PDU. FIG. 3C illustrates an acknowledged mode protocol data unit AM¯PDU.

In FIG. 3A, the TM_PDU transmitted in step 220 includes a data field DATA and a frame check sequence field FCS. After receiving an SDU in transparent mode, encrypted data after segmenting the SDU may be stored in the data field DATA, while the verification code associated with encryption information may be stored in the frame check sequence field FCS.

In FIG. 3B, the UM_PDU transmitted in step 220 includes a data field DATA, header fields UM_header and a frame check sequence field FCS. After receiving an SDU in unacknowledged mode, encrypted data after segmenting the SDU may be stored in the data field DATA; additional data, such as sequence number, length indicator, or PAD, may be stored in a corresponding header field UM_header; the verification code associated with encryption information may be stored in the frame check sequence field FCS.

In FIG. 3C, the AM_PDU transmitted in step 220 includes a data field DATA, header fields AM_header and a frame check sequence field FCS. After receiving an SDU in unacknowledged mode, encrypted data after segmenting the SDU may be stored in the data field DATA; additional data, such as sequence number, length indicator, PAD, or status PDU, may be stored in a corresponding header field UM_header; the verification code associated with encryption information may be stored in the frame check sequence field FCS.

In step 230, the receiver is configured to decipher the PDU and determine whether the deciphered data matches the verification code. In TM, the receiver may decipher the PDU according to MAC communication protocol. In UM or AM, the receiver may decipher the PDU according to RLC communication protocol;

If it is determined that the deciphered data does not match the verification code, the receiver is then configured to execute step 240 for performing the error control procedure. The present invention may adopt various error control procedures well-known to those skilled in the art, such as feedforward error correction (FEC), automatic repeat request (ARQ), or hybrid automatic repeat request (HARQ). FEC is a uni-directional error control procedure in which the receiver is configured to correct or discard erroneous data without informing the transmitter. ARQ is a bi-directional error control procedure in which the receiver is configured to request the transmitter for re-transmission after receiving erroneous data, thereby providing better reliability. HARQ is a combination of FEC and ARQ which may provide good transmission reliability without lowering system efficiency due to frequent data re-transmission.

The present invention may be applied to WCDMA systems in which the RLC layer further adds a frame check sequence field for storing encryption information. The receiver may verify the integrity of the received data accordingly and perform a corresponding error control procedure after detecting transmission error, thereby improving communication quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of error detection for wireless transmission, comprising:
generating, by a transmitting device, an encrypted data by processing a specific data in a specific transmission mode;
generating, by the transmitting device, a verification code according to the specific transmission mode;
providing, by the transmitting device, a protocol data unit (PDU) according to the encrypted data and the verification code; and
after transmitting the PDU by the transmitting device, decoding the PDU and determining whether a decrypted data of the PDU matches the verification code.

2. The method of claim 1, further comprising:
generating a frame check sequence (FCS) as the verification code using a cyclic redundancy check (CRC).

3. The method of claim 1, wherein the verification code includes information associated with an encrypted data content, a length indicator, or a PAD which is generated according to the specific transmission mode.

4. The method of claim 1, further comprising:
performing an error control procedure if the decrypted data of the PDU does not match the verification code.

5. The method of claim 4, wherein the error control procedure includes modifying the decrypted data or requesting data re-transmission.

6. The method of claim 1, wherein the specific transmission mode is a transparent mode (TM), an unacknowledged mode (UM) or an acknowledged mode (AM) according to a radio link control (RCL) communication protocol.

7. The method of claim 6, further comprising:
decoding the PDU according to a media access control (MAC) communication protocol when the specific transmission mode is the transparent mode.

8. The method of claim 6, further comprising:
decoding the PDU according to the RLC communication protocol when the specific transmission mode is the unacknowledged mode or the acknowledged mode.

* * * * *